Patented Aug. 9, 1932

1,870,450

UNITED STATES PATENT OFFICE

LOUIS W. HAAS AND HERBERT O. RENNER, OF CHICAGO, ILLINOIS, ASSIGNORS, BY MESNE ASSIGNMENTS, TO J. R. SHORT MILLING COMPANY, OF CHICAGO, ILLINOIS, A CORPORATION OF ILLINOIS

METHOD FOR IMPROVING AND REMOVING THE ODOR AND/OR FLAVOR OF LEGUMES

No Drawing.   Application filed June 17, 1930.   Serial No. 461,844.

This invention relates to the method of removing objectionable odors and flavors of certain legumes and the like, and to the resultant products obtained from such methods or treatments.

One of the objects of the invention is the provision of a new and improved method of removing the characteristic flavor and odor of legumes and the like that are used for food products without materially affecting their value as food products.

Another object of the invention is the provision of a new and improved leguminous food product that does not possess the characteristic odor or flavor of the legume from which it is obtained.

Another object of the invention is the provision of a new and improved method of removing the characteristic odor or flavor or both from leguminous food products to any degree desired.

A still further object of the invention is vision of a new and improved leguminous food product that has the nutritive value of the legumes from which it was derived, without the characteristic flavor and odor, whereby this material may be more extensively employed in the preparation of ordinary and dietetic food products.

Another object of the invention is the provision of a new and improved method of preparing leguminous food products that is inexpensive to perform, that will sterilize the material, thereby increasing its keeping qualities, and that is effective in removing the characteristic flavor and odor of the legume from which the product is derived, without impairing its nutritive value.

Other and further objects and advantages of the invention will appear from the following description as the same proceeds.

Nearly all legumes, such as beans, peas, lentils and the like possess odors and flavors characteristic for each kind and in most cases strong and objectionable enough to prohibit the use of the same alone or in admixture with food stuffs as regular or special food for human beings. Different methods such as heating and roasting, treatment with oxidizing agents or extraction with certain organic solvents have been previously suggested for removing the objectionable flavor of certain legumes, but none met with satisfactory success, for while the odor of said materials may be removed comparatively easily, the removal of the particularly objectionable flavor of beans, peas, and the like, met with difficulties and still is the problem.

The main object of this invention is to remove to any desired degree, in most cases completely, and without appreciably impairing the nutritive value, especially the enzymes, the flavor and odor of flours of legumes such as soybeans, navy beans, peas, lentils, so that said materials, on account of their nutritive value, may be used more extensively in the preparation of ordinary and dietetic food products having no objectionable or unpleasant flavor and odor.

In general, the invention preferably though not necessarily consists of first disintegrating the legumes as by grinding the same to flour and then treating the flour, the flavor and odor of which is intended to be improved and/or removed, with a suitable reducing agent or agents, such as formaldehyde or other aldehyde or volatile reducing agent, and removing any volatile objectionable flavoring substances which may be formed during such treatment. Experiments have demonstrated that the use of the lower members of the aliphatic aldehydes such as formaldehyde and acetaldehyde give excellent results. It has been found that by such a treatment any one or all of the objects and advantages outlined above may be obtained. There are many ways of accomplishing the desired results, some of which will now be described by way of example.

In case the reducing agent employed is of a gaseous nature, such for instance as formaldehyde, the flour is treated in a closed chamber with the gas alone or mixed with air as may be desired.

In practice, the leguminous material to be treated, if not already ground or reduced to flour, is disintegrated, after which it is placed in a closed chamber and is treated with the reducing gas, such as formaldehyde gas. In order to hasten the action of the gas the ground material may be agitated, while being treated. The gas and fumes formed may then be removed either by treating the mass with a current of air or by slightly heating the same and permitting the gas and fumes to escape, or both.

If the material is heated the temperature is moderate in order not to destroy the enzymes. Preferably the mass is dried at a temperature not exceeding 60° C. The time required for the reaction of the gas on the material will depend on a number of factors, such as the nature of the material, the proportionate amount of the flavor and odor to be removed and the amount of gas employed. Under ordinary circumstances, from one to five hours will be sufficient to remove the odor and flavor to such an extent that the disintegrated material will not be objectionable in use with cereal flour.

In the more objectionable flavors, like that of the soybean, the period of treatment is more or less prolonged, depending on the extent to which the flavor is to be removed. It has been found that by experiment, for instance, if 100 grams by weight of soybean flour be exposed for two days to .925 grams of pure aldehyde gas distributed in four liters of air and following this treatment with heating the material at slightly increased temperature for removing the volatile material, all objectionable odors and flavors are completely removed, and in fact all of the characteristic soybean flavor and odor.

Instead of employing the reducing agent in gaseous form the same may be dissolved in a solvent that is adapted to be evaporated at comparatively moderate temperatures, such as water, alcohol or acetone, and the legumes treated with the liquid. For convenience of description this method may be termed the impregnation method. As in the previous method, the legumes are ground or disintegrated to form finely divided material which is not only in a form more desirable for use in foods, but is in a state that is more easily treated with the reducing agent.

The legume flour or disintegrated material is then impregnated with a solution containing the reducing agent, such for instance as formaldehyde dissolved in water, alcohol or acetone, and after a certain length of time, depending on the strength of the solution and the material treated, the solvent, together with any excess of reducing agent, is removed by pressure or evaporation, or both.

If desired, the material, after it has been thoroughly impregnated with a solution containing the reducing agent, may be subjected first to hydraulic pressure, and finally dried by heating at 50° C. in vacuo for a short time. Subjecting the material to pressure, however, is not an essential step in accomplishing the desired result. By subjecting the mass to pressure a much smaller amount of the reducing agent is required as the pressure will force the liquid through the entire mass. It has been found by experiment that a lesser amount of reducing agent may be employed in the impregnation method than in the gaseous method and is accomplished more economically.

The amount of reducing agent required will depend on the form of treatment, the kind of leguminous material treated, and the strength of the solution used. The following, by way of example, will illustrate the relative proportions of disintegrated material, reducing agent and water. One hundred grams of soybean flour was treated with a solution of reducing agent comprising 0.027 grams of formaldehyde dissolved in fifteen grams of water and then mixed uniformly with the flour. After a certain time the mixture was subjected in a hydraulic press, first to 5000 lbs. pressure for thirty minutes, and then to 18,000 lbs. pressure for five minutes, and finally heated at 50° C. in vacuo for a short time. When the flour was treated with formaldehyde gas as stated above, 0.925 grams was required, while with the impregnation method only 0.027 grams was necessary.

The amount of reducing agent required to obtain the desired results will depend to a considerable extent upon the kind and nature of leguminous material used, upon the proportion of amount of the flavor and/or odor to be removed, and upon the method employed. In any method employed the flour of the legumes will be more or less sterilized, thus improving its purity, keeping quality and commercial value.

We claim as our invention:

1. A method of removing the characteristic flavor of legumes which consists in reducing said legumes to a finely divided state and then treating the finely divided material with a reducing agent of the lower members of the aliphatic aldehyde group for a time sufficient to remove the characteristic flavor and odor.

2. A method of treating legumes which comprises reducting said legumes to a flour and then treating said flour with a lower member of the aliphatic aldehyde group for a time sufficient to simultaneously remove the desired portion of the characteristic leguminous flavor and odor.

3. A method of reducing the characteristic flavor and odor of legumes which consists in disintegrating the legume and then subjecting the disintegrated material to the reducing action of formaldehyde for a time sufficient to remove the characteristic flavor and odor.

4. A method of removing the characteristic flavor of legumes which comprises disintegrating the legumes and then subjecting the disintegrated material to the action of formaldehyde gas in a closed chamber for a time sufficient to remove the characteristic flavor and odor.

5. A method of reducing the characteristic flavor of disintegrated legumes which consists in treating the disintegrated material in a closed chamber with a gaseous reducing agent of the lower members of the aliphatic aldehyde group for a time sufficient to remove the characteristic flavor and odor and agitating the mass to hasten the reaction, and then moderately heating the mass to expel the volatile elements remaining in said mass.

6. A method of reducing the characteristic flavor and odor of legumes which consists in disintegrating the legume and then subjecting the disintegrated material to the reducing action of a solution of one of the lower members of the aliphatic aldehyde group for a time sufficient to remove the characteristic flavor and odor.

7. A method of reducing the characteristic flavor and odor of legumes which consists in disintegrating the legume and then subjecting the disintegrated material to the action of a solution of acetaldehyde for a time sufficient to remove the characteristic flavor and odor, subjecting the mass to pressure and then drying the mass.

In testimony whereof we affix our signatures.

LOUIS W. HAAS.
HERBERT O. RENNER.